United States Patent [19]

Kölker

[11] Patent Number: 4,708,572

[45] Date of Patent: Nov. 24, 1987

[54] VEHICLE FOR THE DELIVERY OF DRINKS

[76] Inventor: Carl W. Kölker, Himmelrich 18, 6340 Baar, Switzerland

[21] Appl. No.: 899,950

[22] Filed: Aug. 25, 1986

[30] Foreign Application Priority Data

Sep. 12, 1985 [DE] Fed. Rep. of Germany ....... 8526052

[51] Int. Cl.⁴ .............................................. B60P 1/02
[52] U.S. Cl. .................... 414/540; 296/181; 296/182; 160/23 R
[58] Field of Search ...................... 296/181, 182, 24 R, 296/98; 414/540, 498, 556; 160/23 R

[56] References Cited

U.S. PATENT DOCUMENTS

| | | | |
|---|---|---|---|
| 2,843,277 | 7/1958 | Brannan | 414/556 |
| 3,451,573 | 6/1969 | Josephian | 296/182 |
| 3,478,856 | 11/1969 | Miller | 296/166 |
| 4,090,039 | 5/1978 | Antkenhouse | 296/181 |

Primary Examiner—Robert R. Song
Attorney, Agent, or Firm—Toren, McGeady & Associates

[57] ABSTRACT

A vehicle (1) for the delivery of drinks comprises a platform (2) providing a loading surface (3) for carrying the drinks. The platform (2) has, with unchanged overall dimensions, sufficient space for easily managed loading and unloading both of full pallets and of individual consignments. For this purpose the platform (2) has a central walkway (4) at a higher level than the lateral loading surfaces (3). It also preferably has a lifting platform (5) which, when raised, is flush with the surface (3).

3 Claims, 6 Drawing Figures

VEHICLE FOR THE DELIVERY OF DRINKS

FIELD OF THE INVENTION

This invention relates to a vehicle for the delivery of drinks comprising a platform which provides a loading surface.

For delivery purposes, the drinks, which are most commonly filled into bottles or cans or barrel-like containers, are transported, for example, in boxes or in the form of cans combined into so-called soft packs. The containers are stored by means of pallets, preferably standard pallets, in pallet compartments, which may be disposed on the platform of the vehicle for receiving the pallets.

BACKGROUND OF THE INVENTION

Whereas the loading of full pallets, stacked for example with boxes of soft packs, can usually be carried out without much difficulty from outside the vehicle by means of a fork-lift truck, since known vehicles are accessible from the longitudinal side, the unloading of individual items to be delivered, in particular, for example one box or a stack of boxes, presents greater difficulty on account of the restricted accessibility of the loaded vehicle. Because the known vehicles have a platform inclined from the outside of the vehicle inwards, fork-lift trucks with an inclined mast are necessary for loading and unloading. That is to say complicated and expensive special structures must be used.

OBJECT OF THE INVENTION

The main object of the present invention is to provide a vehicle which, with unchanged overall dimensions, can have sufficient space for an undisturbed, easily managed loading and unloading both of full pallets and also of individual consignments.

SUMMARY OF THE INVENTION

According to the invention, a vehicle for the delivery of drinks which comprises a platform defining a loading surface, includes the improvement comprising a walkway means and means supporting said walkway centrally and longitudinally of said platform at a higher level than said loading surface on both sides of said walkway.

The difference in height between the lateral loading surfaces and the central walkway extending along the length of the platform preferably corresponds to the depth of the pallets used to load the vehicle, which commonly is 150 mm, so that the upper edge of the walkway is flush with the upper edges of the pallets. The walkway and the tops of the pallets thus lie in one plane. The width of the central walkway is advantageously such that an operator can move along the walkway without problems with a sack barrow or roller container. An individual box or stack of boxes of drinks can then be pulled out by the operator from a lateral pallet compartment on the surface onto the central walkway, lying in the same plane, and be conveyed by means of the sack barrow or roller conveyor.

The items or consignments to be delivered no longer need to be assembled, as was previously usual, on the road, where the driver of the drinks delivery vehicle not infrequently had to line up a large number of boxes of drinks, or stacks of boxes on the road. This often interfered with pedestrian and road traffic, but the consignments can now be assembled in the vehicle itself, and may moreover be protected there from the weather. This is all the more important because, in the transporting of drinks, part-consignments practically always need to be unloaded. The central walkway, moreover, offers the facility of checking the loaded pallets from several sides for completeness, i.e. to ensure that they hold the correct quantity. Previously, loading could only be checked from outside the vehicle.

The central walkway preferably has a lateral recess, into which a raisable and lowerable lifting platform fits and is aligned and flush with the upper edge of the central walkway. Whereas very small orders can be dealt with, for example, at the rear of the vehicle via a door in a back wall of the vehicle body and by a stairway fitted there, in the case of orders of medium size, the stack of boxes can be moved by a sack barrow along the central gangway onto the lifting platform which lies in the same plane as the walkway. The part-orders can thus be brought together on the lifting platform in the desired quantity and be lowered to the ground. The lowered stacks of boxes can then be transported, for example by the sack barrow, to the customer's store. On the return journey of the vehicle, the empty boxes can then be brought back and be placed on the lifting platform, so that the free pallet compartments of the vehicle can immediately be loaded with empty containers in an operation immediately following unloading. Loading and unloading can be carried out exclusively from the sidewalk side of the vehicle.

If a consignment corresponds to one full pallet, then, provided the customer has a lift truck, an empty pallet can be set down on the lifting platform, which in this case should be lowered by the pallet depth dimension of 150 mm below the central walkway. This pallet can then be loaded by the sack barrow from the central walkway by stacking. After the lifting platform has been lowered down to the ground, the lift truck takes over the pallet and transports it into the customer's store. Even roller containers or lattice box roller containers, which can move on the central walkway along the lateral pallet compartments, can if necessary be lowered and raised after loading and unloading by means of the lifting platform.

The vehicle may have a passage from a driver's cab to the central walkway of the platform. Preferably a door-like opening is provided in a rear wall of the driver's cab and a second opening is provided above the central walkway in an end wall, adjacent the cab, of a superstructure on the vehicle platform. The openings face each other and may be connected together by a preferably bellows-like protective and connecting housing, which encloses them. In this manner the central walkway and thus the loading space are immediately accessible for the driver, without any need for him first to descend from the cab to the roadway. This greatly simplifies the work of the driver, especially on roads with heavy traffic, such as main shopping streets with through traffic, the driver being able to reach the load via the central walkway without danger from the moving traffic. The driver therefore no longer needs to walk around the vehicle on the outside, and can carry out loading and unloading, especially of individual orders, straight from the driver's cab.

Where the vehicle superstructure has lateral closure tarpaulins, which possess spring steel strips disposed vertically at intervals, and which can be stretched by lever-actuated eccentric closure mechanisms in the superstructure, automatic rolling-up of the tarpaulins and therefore rapid access to the load which hitherto was not possible, can be achieved. The spring steel-reinforced tarpaulins, when stretched by the eccentric mechanisms, furthermore ensure reliable lateral securing of the load and in addition offer good weather and frost protection and security against theft. The spring steel strips, incorporated in the tarpaulins, may be secured, firstly for example to a circular tube at the upper end of the body and, secondly, to a transverse bar disposed at the bottom in the tarpaulin. The flexible spring steel strips may be about 80 mm wide and 0.5 to 1.5 mm thick. The transverse bar can be engaged into an external frame of the vehicle body, so that the tarpaulin can be pulled tight by means of the eccentric mechanism which rotates the circular tube about its longitudinal axis.

BRIEF DESCRIPTION OF THE DRAWINGS

The invention will now be explained in more detail with reference to an embodiment thereof illustrated in the accompanying drawings in which.

DESCRIPTION OF THE PREFERRED EMBODIMENT

Figures 1, 2:
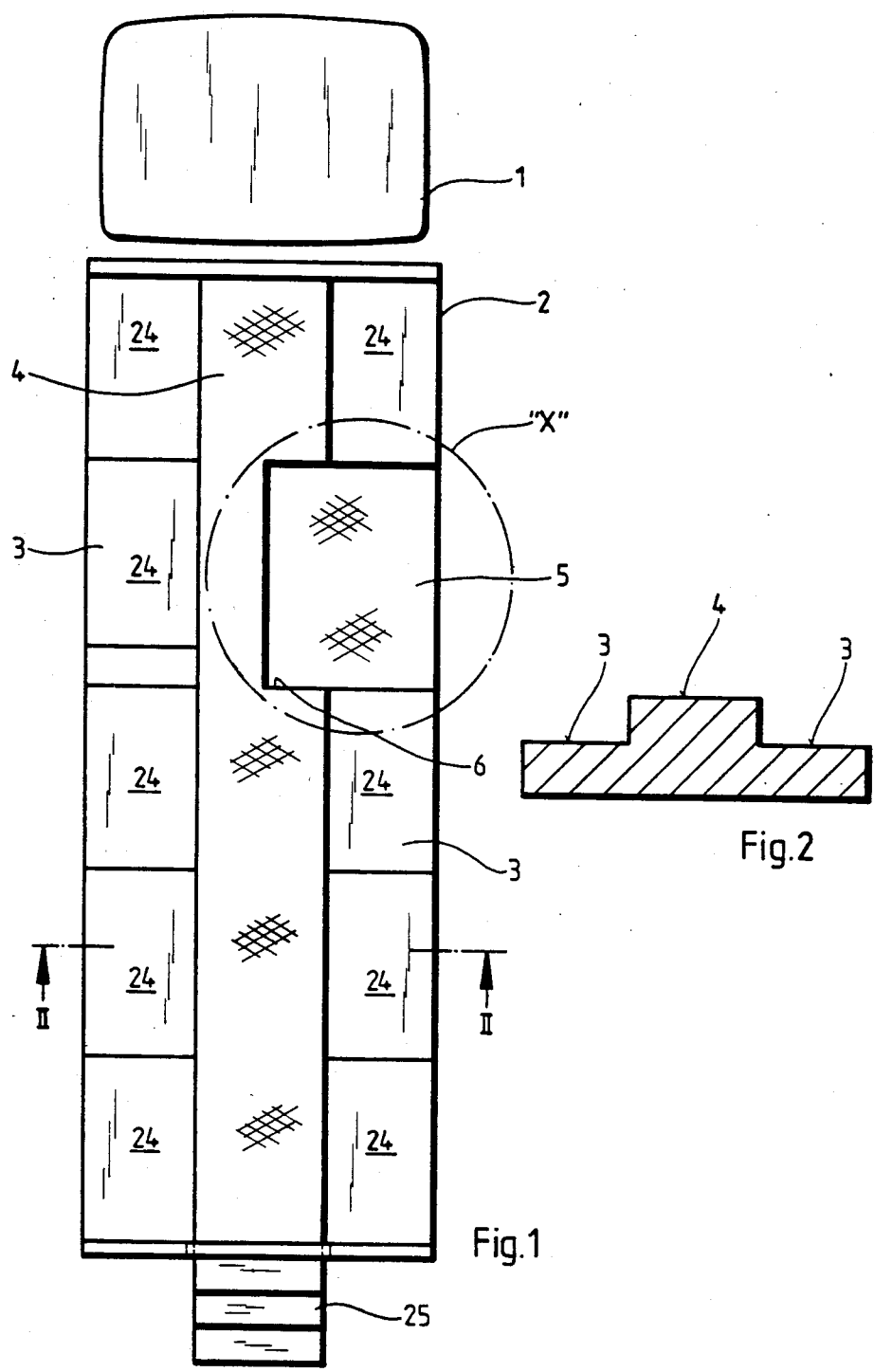
FIG. 1 is a diagrammatic plan view of a platform of the vehicle with a central walkway and a lifting platform integrated with it being shown hatched to distinguish them from lateral loading surfaces at a lower level.
FIG. 2 is a section along the line II—II of FIG. 1.

A vehicle has a platform 2 with a central walkway 4, at a higher level than lateral loading surfaces 3. In the platform 2, at one longitudinal side thereof, preferably the sidewalk or righthand side of the vehicle 1, a lateral lifting platform 5 is disposed, which in its raised position engages into an associated lateral recess 6 of the central walkway and is aligned and flush with the upper edge of the central walkway 4.

Figure 3:
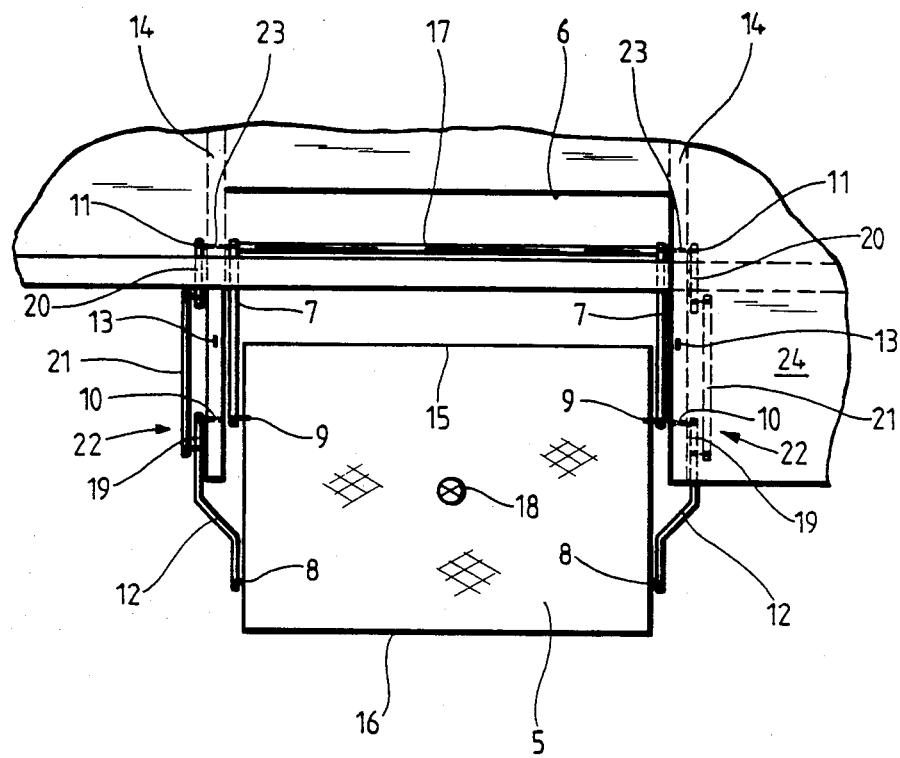
FIG. 3 shows an enlarged view of part of the vehicle surrounded by the circle "X" in FIG. 1.

As shown in FIG. 3, the lifting platform 5 can be raised and lowered onto the ground by parallelogram linkages, for which purpose links 7, 12 act by bearings 8, 9 on both sides of the lifting platform 5. Bearings 10, 11 of the parallelogram linkages, remote from the lifting platform 5, are also located at a support beam, not shown, extending parallel to the lifting platform 5 on each side and situated outside the lifting platform at the top. Each support beam possesses, between the bearings 10, 11, a restraining point 13, constructed as a further bearing at the lower end of a support arm. The support arms, not shown, are each fixed underneath cantilevers 14 of the vehicle chassis extending laterally of the lifting platform, in such a manner that they permit unimpeded pivoting of the links 7 which are innermost with respect to the platform 2. The outer links 12 in relation to the loading surface, by contrast, are pivotally mounted and are cranked at their ends nearest to the lifting platform so that they can move freely between the cantilevers 14 holding the support arms and the lateral edges of the lifting platform 5. The distance between the inner edge 15, as referred to the centre of the platform 2, and the outer edge 16 of the lifting platform 5 is approximately equal to one-half the width of the vehicle.

The effective length of the links 12, outermost in respect of the platform 2, is less than the distance of their bearings 8 nearest to the lifting platform from the inner edge 15 of the lifting platform 5. This distance in turn is, at least in the extended position of the parallelogram linkage, less than the distance between the diagonally opposite bearings 8 and 11, so that the links 7 can be connected at their bearings 11 by a torsion tube 17. The bearings 10, 11 are situated between the projection lines of the inner edge 15 and outer edge 16 of the raised lifting platform 5, the centre of gravity 18 of the raised lifting platform 5 being above the area encompassed by the bearings 10, 11.

The links 7, 12 constitute two-armed cranked levers, the arms 19, 20 of which remote from the lifting platform are cranked towards the outer edge 16 of the raised lifting platform 5 and are pivoted to a thrust rod 21, so that they constitute a further parallelogram linkage 22. The arm 20 of the inner link 7 is torsionally keyed onto a cranked lever shaft 23, which extends through the support beam, not shown here, and is held by the bearing 11. In this manner, the thrust or compressive force exerted by an adjustment unit on the link 12 between the cantilever 14 and the outer link 12 can simultaneously act upon the inner link 7 and, optionally also, via the torsion tube 17, on the two opposite links of the lifting platform 5.

In this manner, the lifting platform 5 can be constituted with a sufficiently large area, so that in particular standard pallets together with a lift truck or a roller container can be raised and lowered, without excessively high forces being required for the raising and lowering. At the same time, the lifting platform 5 is fully available as an integrated part of the loading surface of the vehicle during travelling.

Thus, fairly large part-consignments of drinks on the lateral loading areas 3 of the platform 2, which is loaded with pallets, subdivided for this purpose into a number of pallet compartments 24, are all accessible from the central walkway 4, and can be assembled on the lifting platform 5 and be lowered down to the ground. Smaller consignments or individual boxes or stacks of cans can be delivered via steps 25 at the rear of the vehicle.

Figure 4:
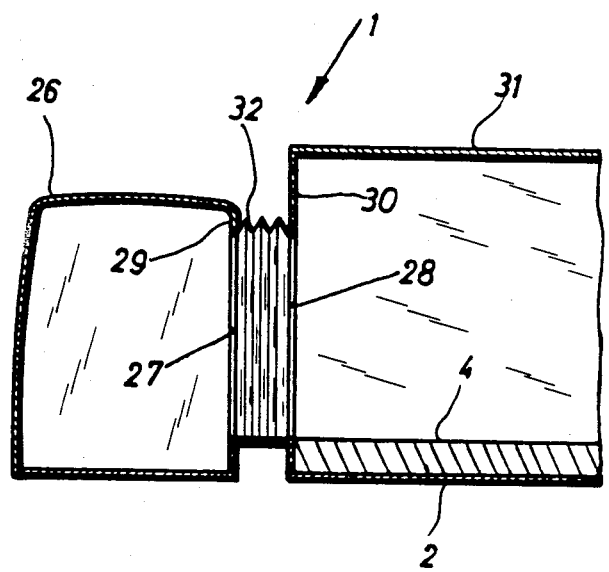
FIG. 4 is a cross-section through a portion of the front part of the vehicle illustrated schematically.

So that the central walkway 4 of the loading space of the vehicle 1 can be reached directly from a driver's cab 26, door-like openings 27, 28 are disposed both in a rear wall 29 of the driver's cab 26 and in a front wall 30, adjacent thereto, of a superstructure 31 of the platform 2 (FIG. 4). The two openings 27, 28 are enclosed and connected together by a protective housing 32, which bridges across the gap between the driver's cab 26 and the vehicle body 31 and provides access for the driver to the superstructure. The housing 32, which is bellows-like, has limited resilience and adapts to and compensates for changes in position caused by relative movements of the cab and superstructure.

Figure 5:
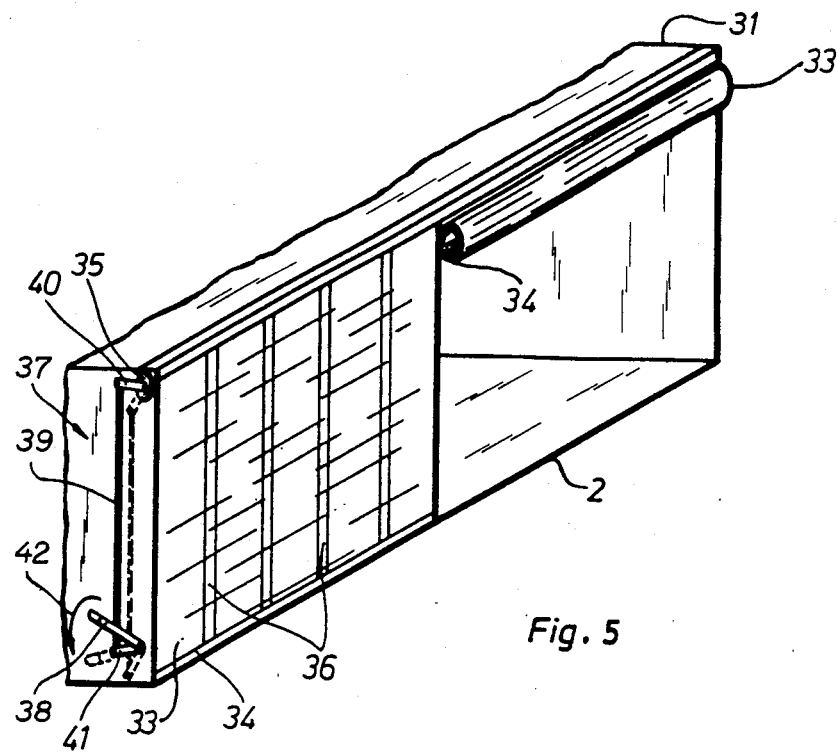
FIG. 5 is a perspective view of a body of the vehicle from one side.
Figure 6:
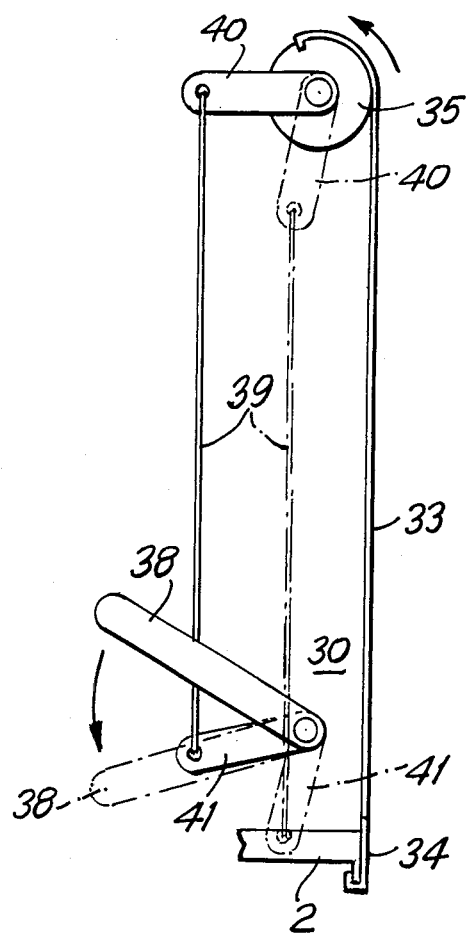
FIG. 6 is an enlarged partial side view of the body of the vehicle showing the eccentric closure.

The loading area of the vehicle 1 is closed at the longitudinal sides by lateral tarpaulins 33 reinforced with spring steel strips 36. The spring steel strips 36, which are disposed vertically at intervals, are fixed with the tarpaulin 33 at one end to a circular tube 35 at the top of the vehicle body 31 and, at the other end, in the tarpaulin 33, to a flat transverse bar 34 or any other suitable member which will withstand the loads during travelling. The pulled-down tarpaulin 33 is hooked by the transverse bar 34 to the outer frame of the vehicle 1 and is stretched tight by pivoting of a lever 38, cooperating with an eccentric closure 37. The eccentric closure 37, which is disposed for example at the front and/or rear end wall 30 of the vehicle body 1, has two adjustment levers 40, 41, coupled together in movement by a tension bar 39 or cable. The upper lever 40, acts upon the circular tube 35 while the other, lower lever 41 is journalled pivotally in the end wall 30 and is connected to the pivoting lever 38, disposed at a suitable gripping height above the ground. When the lever 38 is pivoted in the direction of an arrow 42, the adjustment levers 40, 41 move into the stressed position shown in FIG. 5 in chain dotted lines. This causes the circular tube 35 to rotate about its longitudinal axis and the tarpaulin 33, attached thereto and secured at the bottom in the external frame, to be stretched. For releasing the tarpaulin 33, the lever 38 is pivoted back into its starting position. After the transverse bar 34 has been disengaged, the tarpaulin 33 can automatically roll up, as shown in FIG. 5 in respect of the righthand tarpaulin 33. As better shown in FIG. 6, when lever 38 is rotated in the direction of the arrow, levers 40 and 41, which are connected to each other by the tension bar 39, both rotate in the counterclockwise direction. Since upper lever 40 is connected to the circular tube 35, circular tube 35 also rotates in a counterclockwise direction. This exerts an upward pulling force on the tarpaulin 33. Since the transverse bar 34 is hooked under the platform 2, this produces a stretching effect on the tarpaulin 33. The dot dash line position four arms 38, 40 and 41, as well as bar 39, is shown in FIG. 6. This corresponds to the stretched position of tarpaulin 33.

I claim:

1. In a vehicle for the delivery of drinks, the vehicle comprising a loading platform extending in a longitudinal direction and defining a loading surface, the improvement comprising a central walkway on the loading platform extending in the longitudinal direction, the loading surface comprising a pair of lateral loading surfaces on opposite lateral sides of said walkway, said walkway being at a higher level than the lateral loading surfaces, said central walkway having a lateral recess in a lateral side thereof, a lifting platform having a raised position which is aligned and flush with said walkway, and a lowered position below said walkway, said lifting platform having spaced apart inner and outer edges extending in the longitudinal direction, the distance between said inner and outer edges in a transverse direction extending transversely to the longitudinal direction, being substantially equal to one half the transverse width of the loading platform, said lifting platform while in its raised position being engaged in said recess and extending substantially from a longitudinal center of the loading platform to a lateral edge of the loading platform, and means for mounting said lifting platform for movement between said raised and lowered positions.

2. A vehicle as claimed in claim 1, further comprising a superstructure on said loading platform, tarpaulins laterally enclosing said superstructure, spring steel strips disposed vertically at intervals in said tarpaulins and lever-actuated eccentric closure means for stretching said tarpaulins.

3. A vehicle according to claim 2 wherein said lever-actuated eccentric closure means comprises a circular tube extending in the longitudinal direction and mounted for rotation at an upper end of said superstructure, a first lever fixed to said circular tube, a second lever spaced from said first lever and rotatably mounted to said superstructure, a tension bar connected said first and second levers for transmitting pivoting of said second lever to pivoting of said first lever, and a hooked bar connected to a lower end of said tarpaulin and hooked to the lateral edge of said loading platform, said tarpaulin having an upper end connected to said circular tube, so that pivoting of said second lever causes pivoting of said first lever and rotation of said circular tube for rolling said tarpaulin onto said circular tube to cause stretching of said tarpaulin between said circular tube and said hooked bar.

* * * * *